United States Patent [19]

Mackrle et al.

[11] Patent Number: 4,585,556
[45] Date of Patent: Apr. 29, 1986

[54] ARRANGEMENT FOR REMOVAL OF SLUDGE SEPARATED BY FLOTATION IN THE BIOLOGICAL ACTIVATING CLEANING OF WASTE WATERS USING A FLUID FILTRATION

[75] Inventors: Vladimir Mackrle, Praha; Svatopluk Mackrle, Brno, both of Czechoslovakia

[73] Assignee: Agrozet, koncernova obchodna organizacia, Zvolen, Czechoslovakia

[21] Appl. No.: 725,154

[22] Filed: Apr. 22, 1985

Related U.S. Application Data

[63] Continuation of Ser. No. 504,277, Jun. 14, 1983, abandoned.

[30] Foreign Application Priority Data

Jun. 14, 1982 [CS] Czechoslovakia ............... 4401-82

[51] Int. Cl.⁴ .......................... C02F 11/02; C02F 3/12
[52] U.S. Cl. .............................. 210/221.2; 210/195.3; 210/207; 210/539; 210/540; 210/608
[58] Field of Search ............ 210/608, 626, 776, 221.2, 210/242.1, 242.2, 525, 540, 539, 195.3, 205, 207

[56] References Cited

U.S. PATENT DOCUMENTS

| | | | |
|---|---|---|---|
| 1,200,951 | 10/1916 | Kelly | 210/540 |
| 1,960,686 | 5/1934 | Tumim | 210/776 |
| 2,874,842 | 2/1959 | Krofta | 210/540 |
| 3,224,964 | 12/1965 | Derenk | 210/608 |
| 3,307,701 | 3/1967 | Krofta | 210/221.2 |
| 3,642,617 | 2/1972 | Brink | 210/776 |
| 3,642,618 | 2/1972 | Silva | 210/221.2 |
| 3,846,299 | 11/1974 | Krasnoff | 210/221.2 |
| 3,970,556 | 7/1976 | Gore | 210/776 |
| 4,144,170 | 3/1979 | Dunkers | 210/221.2 |
| 4,157,952 | 6/1979 | Krofta | 210/221.2 |

FOREIGN PATENT DOCUMENTS

| | | | |
|---|---|---|---|
| 2024794 | 1/1980 | United Kingdom | 210/608 |
| 2035285 | 6/1980 | United Kingdom | 210/221.2 |

Primary Examiner—Ernest G. Therkorn

[57] ABSTRACT

Arrangement for biological activating cleaning of waste waters having a separating space and an activating space, the separating space being disposed above the activating space in a single container. The arrangement permits a surface take-off of cleaned water without reduction of the capacity for water treatment of the arrangement. In case part of the biocenology of the activated sludge becomes extinct or impaired, the arrangement permits an easy removal of sludge separated by floating from the surface of the content of the separating space.

3 Claims, 2 Drawing Figures

ARRANGEMENT FOR REMOVAL OF SLUDGE SEPARATED BY FLOTATION IN THE BIOLOGICAL ACTIVATING CLEANING OF WASTE WATERS USING A FLUID FILTRATION

This is a continuation application of application, Ser. No. 504,277, filed June 14, 1983, now abandoned.

BACKGROUND OF THE INVENTION

This invention relates to an arrangement designed for biologically activated cleaning of waste waters wherein the separation of activated sludge from cleaned water is accomplished by fluid filtration.

The high efficiency of fluid filtration for the separation of particles of activated sludge having a higher specific weight than water is commonly known. Discrete particles of activated sludge which have a lower specific weight than water and which thus have a tendency for flotation are not returned by the filter mechanism in the fluid layer of the filter, and penetrate into the layer of cleaned water above the level of the fluid filter. Such lower specific weight discrete particles of activated sludge are thus removed together with the cleaned water by the take-off system for the cleaned water. The activated sludge separated by flotation contaminates the clean water, both by an increase in the amount of undissolved materials, and by an increase of the residual organic contamination expressed in values of $BSK_5$ and $CHSK$ units.

There are a number of different causes of this unwelcome flotation of a part of the activated sludge. One of the main reasons, particularly with apparatus of the column type with a high water column in the activation, is the separation of air bubbles on particles of activated sludge in the separating space. The air bubbles sticking to such particles are capable of reducing their specific weight below the specific weight of water. A similar particle is not retained in the layer of the fluid filter, and is taken along for draining, thus worsening the quality of the cleaned water. The separation of air bubbles is due to the oversaturation of the activating mixture by air in the course of aeration of the activating mixture.

In the case of a very fast vertical circulation of the activating mixture, and in case the separating space is situated in the upper part of the apparatus, all excess air cannot be separated during the course of the upward movement of the mixture wherein a reduction of the hydrostatic pressure takes place. In such a case, the activated mixture enters the separating space with a substantial oversaturated by air. The higher the activating space, the higher is such oversaturation, and thus also the flotation effect due to separated air bubbles is most pronounced with apparatus of the column type. Air from the oversaturated mixture is not separated uniformly. Such separation is particularly marked at places of reduced pressure, for instance, at locations wherein the speed of the liquid flow is increased, where reduced cross-sections are present, or in case of a sudden change of direction flow, for instance around the edge of an inlet opening to the separating space where the direction of flow of the activating mixture changes from a downward direction to an upward direction.

The separation of excess air by said effect is also utilized for degassing the activating mixture, for instance, by the introduction of partition walls in the activating space in front of the separation space; this accelerates the flow or changes in the direction of flow of the activating mixture in the required degree in order to achieve degassing.

The negative influence of the separation of air bubbles at the inlet into the separating space is usually removed by the introduction of a trap for catching floating sludge in the space of the fluid filter; such trap retains the floated sludge and concentrates is in its upper part at the surface. By the use of these means, a substantial reduction of escape of activated sludge into the cleaned water has been achieved. Thus far, the above-mentioned solutions have not been used, the escape of activated sludge, particularly with column arrangements for activation cleaning of water, can achieve such intensity that the amount of activated sludge separated by flotation can be so large as to make impossible the function of the entire arrangement.

Even if the above-described means is employed, it is impossible to prevent separation of air directly in the fluid layer and thus a small amount of activated sludge always has the tendency for flotation, particularly in case of a non-uniform loading of the arrangement, with a sudden hydraulic overload, and thus a certain smaller escape of suspension to the surface of the separating space must always be reckoned with.

Another cause of flotation of activated sludge can be the presence of some material which is lighter than water. The sticking of such lighter material to particles of activated sludge can cause their flotation.

The most intense flotation occurs in case of the non-activation of part of the activated sludge if toxic material starts to be active, or by a change in temperature which causes a change of the population of the biocenology, and the like. In such case, extinct microorganisms, having a tendency for flotation, cause the extraction of a large amount of activated sludge to the surface of the activating space, and its being taken along into the waste, so that a substantial worsening of the quality of the cleaned water is the result.

In order to prevent penetration of activated sludge separated by flotation into the cleaned water, a removal of clean water below the surface is also used. In that case, the sludge separated by flotation accumulates at the surface of the separating space, and forms a floating layer which is not taken along into the off-take of cleaned water sufficiently below the surface.

The cleaned water off-take below the surface has, in addition to an improvement of the cleaning effect, also the advantage of a simplification of the off-take of water, as it is less demanding as to the accuracy of its arrangement than the sensitive system of cleaned water off-take by overflow.

Overflows at the surface are used for the removal of the suspension separated by flotation, by way of which part of the cleaned water including the sludge separated by flotation continuously overflows, and is removed to a pumping pit from which it is returned back into the activating space, whereas the take-off proper of cleaned water is provided below the surface. A drawback of this arrangement is an increased hydraulic load of the separation. If the suspension separated by flotation has to be effectively removed, the overflowing amount of water has to be rather large, and there must be many overflows along the whole surface, so that the suspension separated by flotation can be removed from the whole separating surface. As the maximum intensity of removal of water by way of these overflows is just at the maximum hydraulic load, an increase of the hydraulic peak load due to recirculation of water can achieve one-fifth to one-fourth of the hydraulic load, thus reflecting unfavorably and rather sensitively on the overall capacity of the arrangement.

In addition to the mentioned drawbacks, the system of continuous take-off of sludge separated by flotation has also the drawback that in case of a calamity flotation, for instance in case the condition of activating cleaning passes to another condition with changes of temperature, or if part of the biocenology of the activation is extinct due to toxic material, this take-off of sludge separated by flotation is no longer sufficient, and a removal of the floating sludge layer is in such case rather difficult.

SUMMARY OF THE INVENTION

The present invention has among its objects the elimination or at least the substantial reduction of the drawbacks of the prior art set forth above.

In accordance with this invention, a trap for catching sludge separated by flotation is provided at the level of the operation surface of the separating space above a ring for collecting cleaned water, such ring being connected with a collecting vessel, the overflow of which, formed by its upper edge, is at the level of an increased surface and is connected to a sub-atmospheric sucking-off means.

An arrangement in accordance with the invention is advantageous wherein the collecting vessel is disposed in the upper part of the trap for catching sludge separated by flotation.

From the point of view of construction, manufacture and operation, an arrangement is advantageous wherein the collecting vessel comprises a part of an extension of the trap for catching sludge separated by flotation, a bottom and a partition wall, wherein a by-pass opening is provided, forming the connection of the trap with the collecting vessel, the overflow of which is represented by the upper edge of this part of the extension.

According to another embodiment, an adjustable gate is provided between the catch trap for sludge separated by flotation and the collecting vessel.

An easy arrangement of operating conditions provides a connection of the collecting ring with the removal of cleaned water, wherein a sliding valve for adjustment of the operation level of the increased surface is arranged.

DESCRIPTION OF THE DRAWINGS

An exemplary embodiment of the arrangement of the invention is shown diagrammatically in the attached drawings, wherein.

DESCRIPTION OF PREFERRED EMBODIMENT

Figure 1:
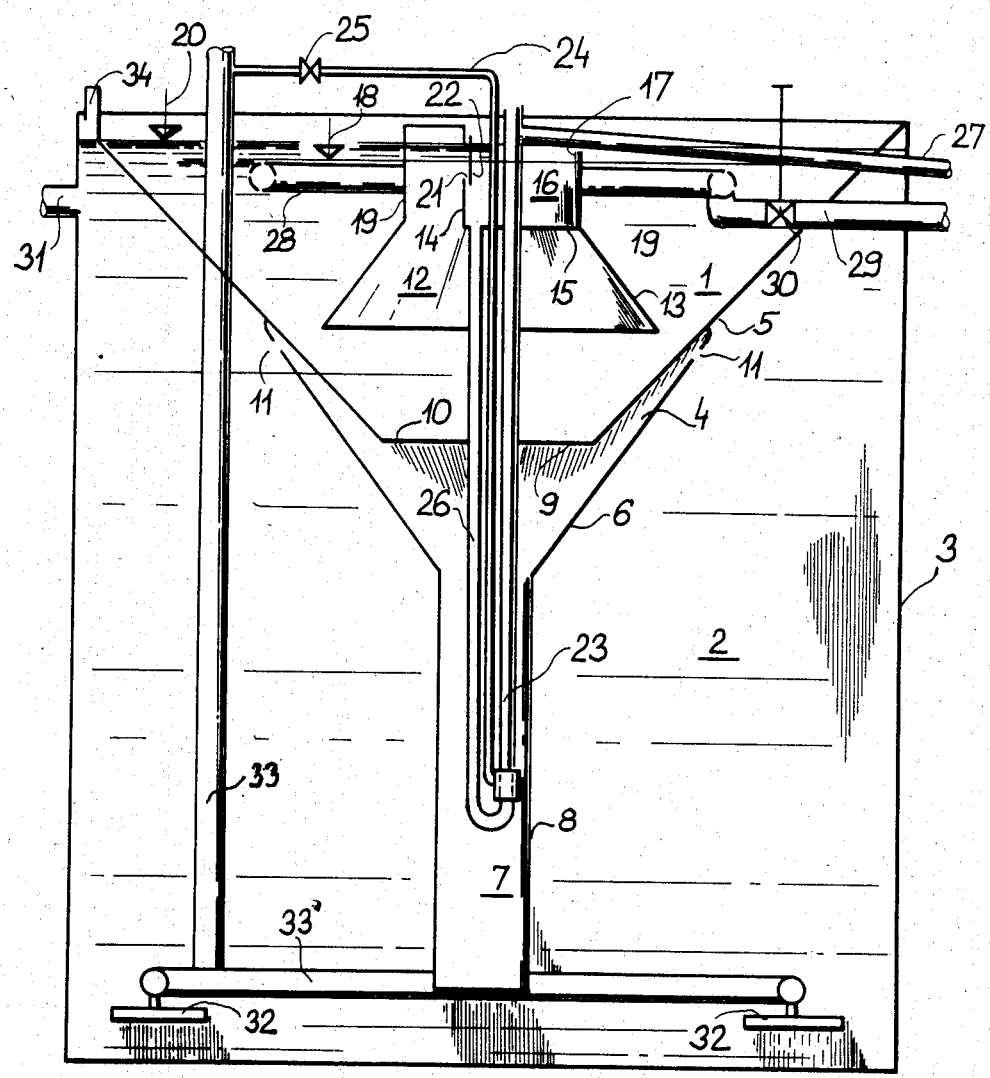
FIG. 1 is a view partially in vertical section and partially in side elevation of the arrangement.
Figure 2:
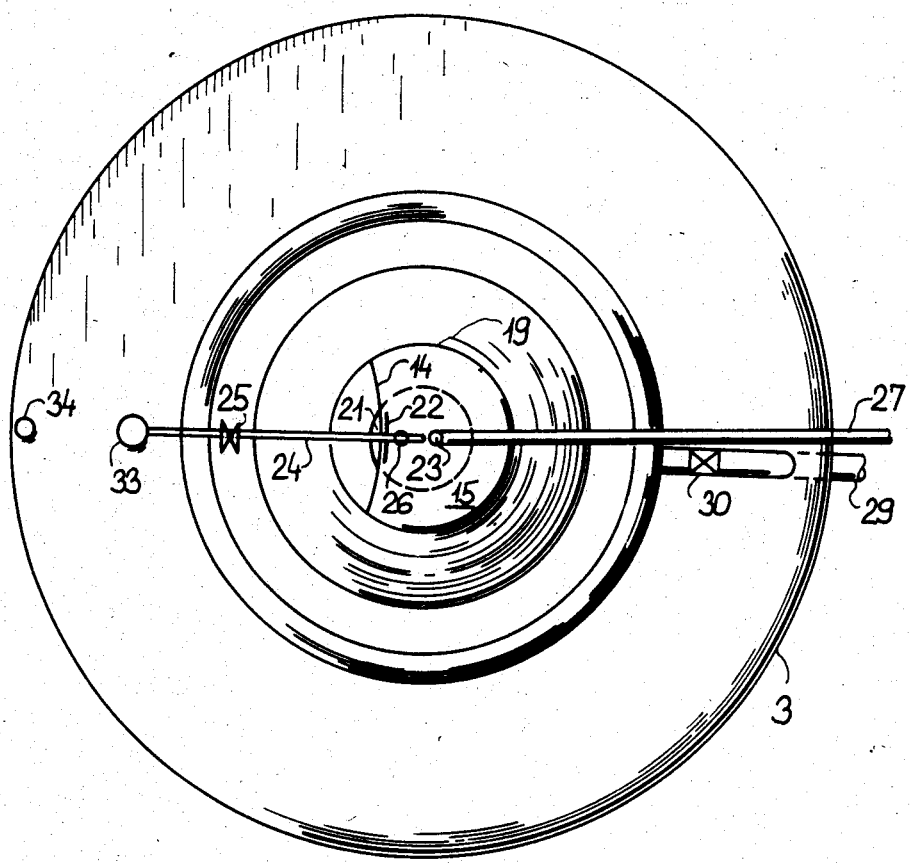
FIG. 2 is a plan view thereof.

The arrangement as shown in the drawings is an apparatus for the cleaning of water, such arrangement having a separating space 1 disposed above an activating space 2 in a single container having an outer wall or mantle 3. The interconnection of the activating space 2 with the separating space 1 is accomplished by a by-pass channel 4 formed by an inclined partition wall 5, which in the apparatus shown is of conical shape, wall 5 separating the separating space 1 from the activating space 2, and by a lower inclined wall 6, also of conical shape, disposed below the inclined partition wall 5 and having an apex angle somewhat smaller than that of partition wall 5, the lower inclined wall 6 passing over in its lower part into a return channel 7 formed by a cylindrical conduit or mantle 8.

An inlet passage 9 for the separating space 1 is provided in its lower end, the passage being formed by the lower edge 10 of the inclined partition wall 5. The by-pass channel 4 communicates in its upper part with the activating space 2 through inlet openings 11 in the lower inclined wall 6. A catch trap 12 for sludge separated by flotation is disposed within the separating space 1, trap 12 being formed by an upwardly converging frusto-conical wall 13 which joins at its top with a vertically disposed circular cylindrical extension 19.

A vessel 16 for collecting sludge separated by flotation is formed in the upper part of the trap 12 by a partition wall 14, a bottom 15, and by a part of the extension 19. The upper edge of this part of the extension 19 is situated above the operation level 18 of the liquid in the separating space 1. The remaining circumferential part of the extension 19 and the said partition wall 14 extends beyond the so-called increased surface 20, which will be discussed later. The partition wall 14 is provided with a by-pass opening 21 with an adjustable gate 22. The vessel 16 for collecting sludge separated by flotation is connected to an air lift-pump 23 with a supply pipe 24 of pressure air provided with a regulating valve 25 and connected with a source of pressure air (not shown). The air-lift pump 23 is connected by its suction part to the collecting vessel 16 by a draining conduit 26. Both the air-lift pump 23 and the draining conduit 26 pass through the lower part of the separating space 1 and extend into the return channel 7. The outlet of the air-lift pump 23 terminates above the operation level 18, from which a sludge withdrawal conduit 27 extends.

A perforated ring 28 with a take-off 29 for cleaned water is situated in the upper part of the separating space 1 below the operation level 18. A slide valve 30 is provided in the take-off 29.

A raw water supply 31 terminates into the upper portion of the activating space 2. The activating space 2 is provided with a pneumatic aeration system comprising in the embodiment shown a vertical air distribution pipe 33 supplied with air by a blower (not shown) the lower end of pipe 33 being connected to a horizontal distributing ring 33' which in turn is connected to a plurality of aeration elements 32. A deaerating stack 34 is provided at the top of the activating space 2.

MANNER OF OPERATION OF THE ARRANGEMENT

The described arrangement operates as follows:

Raw water enters through the raw water conduit 31 into the activating space 2, where air is dispersed by the aeration system by way of aeration elements 32. A part of the air supply is dissolved in the activating mixture, the amount of air thus dissolved depends on the depth in the activating space to which the aeration elements 32 are immersed. Due to the air-lift effect of the air thus supplied, an intense circulation of the liquid in the activating space is generated in a vertical direction, in the course of which known activating cleaning operations proceed. The air is taken off after passage through the activating space 2 by one or more deaeration stacks 34.

The activating mixture is supplied from the activating space 2 through inlet openings 11, a by-pass channel 4, and an inlet passage 9 into the separating space 1. With the sudden change of flow direction around the lower edge 10 of the inclined partition wall 5 a reduction of pressure is created in the circulating liquid, due to local acceleration of the liquid flow. As a result, fine air bubbles from the oversaturated activating mixture are released; such air bubbles stick onto the particles of activated sludge. The particles of activated sludge with air bubbles sticking to them are lighter than the activating mixture and float upwardly toward the surface of the liquid.

The higher the liquid column in the activating space 2 the more intense is its aeration due to the higher load of activation by contaminating material, the higher is the separation of air bubbles at the entrance into the separating space, since the oversaturation of the activating mixture by air is higher.

The floating activating sludge is caught by the sludge trap 12, which trap 12 due to its conical, upward narrowing shape, concentrates it at the operation level 18 in the upper extension 19 communicating directly with the space below the conical wall 13.

The thus concentrated sludge separated by flotation is, from time to time, drained through the by-pass opening 21 to the collecting vessel 16, from which the sludge is pumped by a suitable suction device, advantageously an air-lift pump 23 by way of the sludge withdrawal 27 beyond the arrangement, for instance, into a sludge storage vessel (not shown).

In case no pneumatic aeration system is employed, and no pressure air is available for the air-lift pump 23, a suitable underpressure vessel (not shown) connected to the sludge withdrawal 27 can be used for taking off sludge separated by flotation, which sludge is rather thick and will not flow out of the collecting vessel 16 under the action of gravity. The removal of floating sludge separated by flotation from the upper part of the trap 12 can be achieved by both said methods.

Since at the entrance of the activating mixture into the separating space 1 through the inlet passage 9 no complete elimination of oversaturation of the activating mixture by air is achieved, some separation of air bubbles can occur even in the proper fluid filter in the separating space 1 beyond the place of action of the sludge trap 12; thus some flotation of a part of the activating sludge toward the operating level 18 occurs in the separating space 1.

By arranging the take-off system of cleaned water below the operation level 18, using a perforated collecting ring 28, the taking along of floating particles of sludge into the cleaned water can be prevented, and the sludge separated by flotation collects as a floating layer at the operation level 18. The operation level 18 is maintained under normal conditions in its position above the perforated ring 28 by adjustment of slide valve 30.

For a periodic removal of floating sludge separated by flotation from the level in the separating space 1, the fluid level is raised by closing the slide valve 30 up to the level of the increased surface 20, i.e. above the level of the upper edge 17 of part of the cylindrical extension 19. In case of the increased surface 20, the floating sludge separated by flotation can overflow over the upper edge 17 into the collecting vessel 16, from which it is pumped by the air-lift pump 23 or by an underpressure vessel (not shown).

With larger arrangements, it is possible mechanically to boost the described collection of sludge separated by flotation from the increased surface 20, for instance manually. This, however, does not represent high demands on the maintenance of the apparatus, so that the whole operation can be easily carried out. This also holds true for calamity flotation due to incorrect functioning of the activation in the case of the extinction of a larger amount of biocenology.

The arrangement according to the invention has a number of advantages. It primarily permits the use of sub-surface take-off of cleaned water with a substantial improvement of the quality of the water without the reduction of the capacity of the arrangement. In the case of a calamity deterioration of the functioning of the activation and extinction of the biocenology of the activated sludge, it simultaneously permits an easy removal of the floating sludge separated by flotation from the level of the separating space.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. An arrangement for the separation of sludge separated by flotation in the biological activating cleaning of waste water using fluid filtration, said arrangement comprising an activating space above which a separating space is provided, said separating space being provided with a sludge trap, for catching sludge separated by flotation, above its inlet passage and with a collecting ring for sub-surface take-off of cleaned water in its upper part, said sludge trap being located at the level of the operating surface of the separating space above the collecting ring for cleaned water;

said sludge trap comprising an upper cylindrical part and a lower frusto-conical part;

a collecting vessel with an overflow and a sucking-off device for the sludge, the collecting vessel being disposed in the upper part of the sludge trap, the sludge trap being connected with said collecting vessel, the overflow of the collecting vessel being formed by its upper edge disposed at the level of an increased surface of liquid and connected to a sucking-off device;

wherein the collecting vessel is formed by part of the upper cylindrical part of the sludge trap, by a bottom, and a partition wall provided with a by-pass opening forming the connection of the sludge trap with the collecting vessel, the overflow of the sludge trap being formed by the upper edge of the upper cylindrical part.

2. An arrangement in accordance with claim 1, comprising an adjustable gate disposed in the connection between the sludge trap and the collecting vessel.

3. An arrangement as in claim 1, wherein the collecting ring of cleaned water is connected to a take-off of cleaned water, and comprising a slide valve provided in said take-off of cleaned water for the adjustment of the operating surface and the adjustment of the increased surface of the separating space.

* * * * *